(12) United States Patent
McNeil

(10) Patent No.: US 7,310,654 B2
(45) Date of Patent: Dec. 18, 2007

(54) METHOD AND SYSTEM FOR PROVIDING IMAGE INCREMENTAL AND DISASTER RECOVERY

(75) Inventor: Daniel D. McNeil, Tigard, OR (US)

(73) Assignee: Mirapoint, Inc., Sunnyvale, CA (US)

( * ) Notice: Subject to any disclaimer, the term of this patent is extended or adjusted under 35 U.S.C. 154(b) by 1046 days.

(21) Appl. No.: 10/066,109

(22) Filed: Jan. 31, 2002

(65) Prior Publication Data
US 2003/0145248 A1     Jul. 31, 2003

(51) Int. Cl.
*G06F 17/30*     (2006.01)
*G06F 11/00*     (2006.01)

(52) U.S. Cl. .............. 707/204; 707/101; 707/102; 707/103 X; 707/104.1; 714/6

(58) Field of Classification Search ............ 714/6; 707/204, 202, 101, 102, 103 X, 104.1, 203, 707/201; 709/226; 711/162
See application file for complete search history.

(56) References Cited

U.S. PATENT DOCUMENTS

| | | | | |
|---|---|---|---|---|
| 5,195,025 | A * | 3/1993 | Boecker et al. | 700/16 |
| 5,604,862 | A * | 2/1997 | Midgely et al. | 714/6 |
| 5,799,147 | A * | 8/1998 | Shannon | 714/6 |
| 5,852,713 | A | 12/1998 | Shannon | |
| 6,038,569 | A * | 3/2000 | Beavin et al. | 707/203 |
| 6,148,412 | A * | 11/2000 | Cannon et al. | 714/6 |
| 6,415,300 | B1 * | 7/2002 | Liu | 707/204 |
| 6,430,577 | B1 * | 8/2002 | Hart | 707/201 |
| 6,662,198 | B2 * | 12/2003 | Satyanarayanan et al. | 707/204 |
| 6,704,885 | B1 * | 3/2004 | Salas-Meza et al. | 714/6 |
| 6,785,786 | B1 * | 8/2004 | Gold et al. | 711/162 |
| 6,880,008 | B1 * | 4/2005 | Yoneda | 709/226 |
| 2002/0107877 | A1 * | 8/2002 | Whiting et al. | 707/204 |

FOREIGN PATENT DOCUMENTS

| | | | |
|---|---|---|---|
| EP | 0410630 A2 * | 1/1991 | |
| EP | 767431 | 4/1997 | |

OTHER PUBLICATIONS

"Oracle 7 (TM) Server Administrator's Guide," 1992, published by Oracle Corporation (TM), Chapter 18 (pp. 18-1 to 18-19).*
VERITAS Backup Exec for Windows NT and Windows 2000; Internet Article, May 2001, 1 page.

* cited by examiner

*Primary Examiner*—Thuy Pardo
(74) *Attorney, Agent, or Firm*—Bever, Hoffman & Harms, LLP; Jeanette S. Harms

(57) ABSTRACT

A method for backing up data in a computer system from at least one primary data source to a secondary data source is provided. The method includes performing a full image backup on a plurality of data blocks stored by the primary data source(s). An incremental backup can then be initiated at a predetermined interval. During this incremental backup, the modification time of each file/folder at the predetermined interval can be compared to a defined time. If the modification time is earlier than the defined time, then the data blocks of that file/folder can be excluded from the incremental backup. If the modification time is later than the defined time, then the data blocks of that file/folder can be included in the incremental backup. This method can be used to provide an efficient disaster recovery using a network.

16 Claims, 4 Drawing Sheets

METHOD AND SYSTEM FOR PROVIDING IMAGE INCREMENTAL AND DISASTER RECOVERY

BACKGROUND OF THE INVENTION

1. Field of the Invention

The present invention relates to a method and system for backing up data from a data source, and particularly to using metadata to provide an efficient and cost-effective incremental backup.

2. Related Art

Backing up data from one or more computer disks is typically performed to recover from inadvertent user deletions/overwrites or from disk hardware failure. In the case of inadvertent user deletions/overwrites, only the data corresponding to the destroyed data is copied to the original disk from the backup. In the case of disk hardware failure, the user can restore all files to the original disk from the most recent backup. In most computer systems, the backup device is a tape drive, which can accommodate large amounts of data at a relatively low cost per byte of storage.

Generally, conventional backup methods provide for either file-by-file backup or image backup. In a file-by-file backup, the backup program copies one file at a time from the disk to the tape. Specifically, the program places all pieces of data for each file, irrespective of actual locations on the disk, into a single sequential block that is stored on the tape. Thus, a file-by-file backup can easily provide an incremental backup, wherein only those files that have been modified or added since the last backup are written to tape. However, a file-by-file backup fails to ensure that all changes to the files are noted. Specifically, the file-by-file backup fails to indicate removes (wherein a file has actually been deleted), renames (wherein the file is renamed), or links (wherein a file, such as an email, includes pointers to other files, e.g. other mail boxes). It also can be slow since files are written to tape in file order not disk order.

In an image backup, the data image is read sequentially from the disk and written to the tape. Because disk order (not file order) is used, an image backup can be significantly faster than a file-by-file backup. Image backups have most often been used for full backups only. Image incremental backups exist today but are based on block-change lists. That is, an additional software layer must be used at the file system layer or at the device driver layer that tracks changes to underlying storage on a per block basis. Typically, when a portion of a file is re-written, the data can be written directly over the old data.

In systems that want to provide image incremental backups, the additional software to track changes must be enabled. This software, at a minimum, must track which portion of the file system or storage has been re-written. This usually involves updating a map or a list tracking which blocks have been re-written. Thus, all write operations now require at least two writes: one write to update the change list or map and another write to write the data. Therefore, this method adds 100% overhead for writes on systems wanting to enable image incremental backups. Note that some implementations require even more than 2 writes, thereby further increasing the overhead. To perform an image incremental backup, these systems read the list of changed blocks, and then copy each changed block from the disk to the tape.

Therefore, a need arises for a system that provides quick image incremental backups, without requiring the additional overhead of updating a change list or map.

SUMMARY OF THE INVENTION

A method for backing up data in a computer system from at least one primary data source to a secondary data source is provided. The method includes performing a full image backup on a plurality of data blocks stored by the primary data source(s). An incremental backup can then be initiated at a predetermined interval. During this incremental backup, the modification time of each file and folder is examined. If the modification time is earlier than the defined time, then the data block used by that file/folder is added to an unused data block list. All files/folders are examined in a similar manner. All blocks, except those data blocks in the unused list, can then be written to tape with their file system metadata.

Another method to accomplish this image incremental backup, is to examine the modification time of each file and folder, and list all data blocks associated with the files/folders whose modification time is later than the defined time in the incremental backup. All files/folders are examined in a similar manner. All blocks on the used list can then be written to tape with their file system metadata.

In either approach, this method creates an image incremental backup that includes the file system metadata and all data from files/folders that have changed since the last backup. The data is written in disk order and, because it does not contain data from files/folders that have not changed, the amount of data and the time it takes to write the data to tape is much smaller than a full image backup.

In one embodiment, the defined time is a time when the full image backup was performed. In another embodiment, the defined time is a time when a last incremental backup was performed. In yet another embodiment, the defined time is either a first time when the full image backup was performed or a second time when a last incremental backup was performed, whichever is the most recent.

Because file systems, by design, already track each file/folder's modification time, this metadata is available and can be tracked without any additional overhead during normal operation. Checking modification times only during the incremental backup eliminates the significant overhead associated with tracking blocks that change during normal operation.

As this method of incremental backup is dependent on modification time being accurate for correctly determining which file and folder's data blocks are backed up during a incremental backup, special steps can be taken if the system clock is ever adjusted in time. For example, if the system clock is adjusted backwards, then the time comparison would be incorrect if the system time is adjusted earlier than the last recorded backup. In one embodiment, if the system clock has been changed, then a full image backup can be performed on the plurality of data blocks. If the system clock has not been changed, then the process can initiate the incremental backup at the predetermined interval. In another embodiment, if the system clock has not been changed, then the process can return to comparing the modification time of each file/folder at the predetermined interval to the defined time.

DETAILED DESCRIPTION OF THE DRAWINGS

Figure 1A:
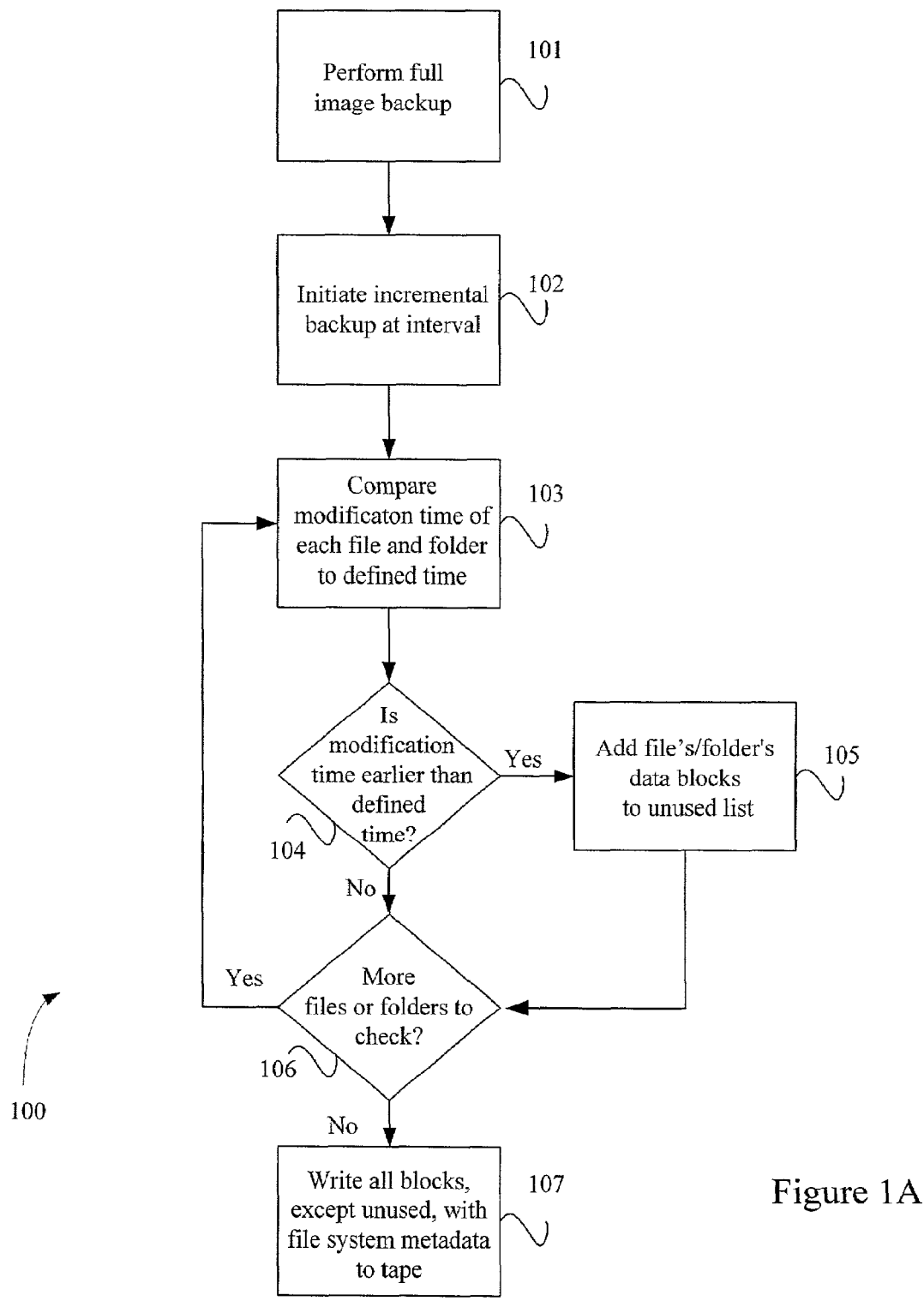
FIG. 1A illustrates one embodiment of an image backup method using the modification time of each file and folder to exclude data from files and folders that have not changed from the image incremental backup.

In accordance with one aspect of the invention, each file and folder's modification time (stored in file system metadata) can be used to provide an accurate, time-efficient incremental backup. FIG. 1A illustrates one method 100 of providing such an incremental backup. In method 100, a full image backup can be performed in step 101. Then, an incremental backup can be initiated at a predetermined interval in step 102.

In one embodiment, the predetermined interval can be programmably set by a system administrator. For example, an interval could be set to end during an off-peak time as determined by typical system use. For most office environments, this off-peak time could occur at night when most system users are not present.

During the incremental backup, the modification time of each file and folder can be compared to a defined time in step 103. In one embodiment, the defined time is the time from the last backup, i.e. the time of the full backup or the last time of an incremental backup, whichever is the most recent. This embodiment provides a standard incremental backup. In another embodiment, the defined time is the time from the last full backup, thereby providing a cumulative incremental backup. Note that a standard file system already stores these modification times as part of the file system metadata. If the modification time is earlier than the defined time, as determined in step 104, then the data block including that file/folder can be added to the unused list in step 105. This loop continues until all files/folders have been examined, as determined by step 106. In step 107, the image incremental is written to tape by writing all blocks to tape, except those blocks on the unused list, as well as their file system metadata. In other words, this step excludes all blocks not in use, i.e. all blocks added to the unused list in step 105. (Note that a data block is the smallest unit of storage assigned to a file. In other words, a data block only belongs to a single file. Typically, a data block can be 1 k.) Thus, an image incremental backup has been accomplished that includes all the data from files/folders that have been modified as well as the file system metadata.

Figure 1B:
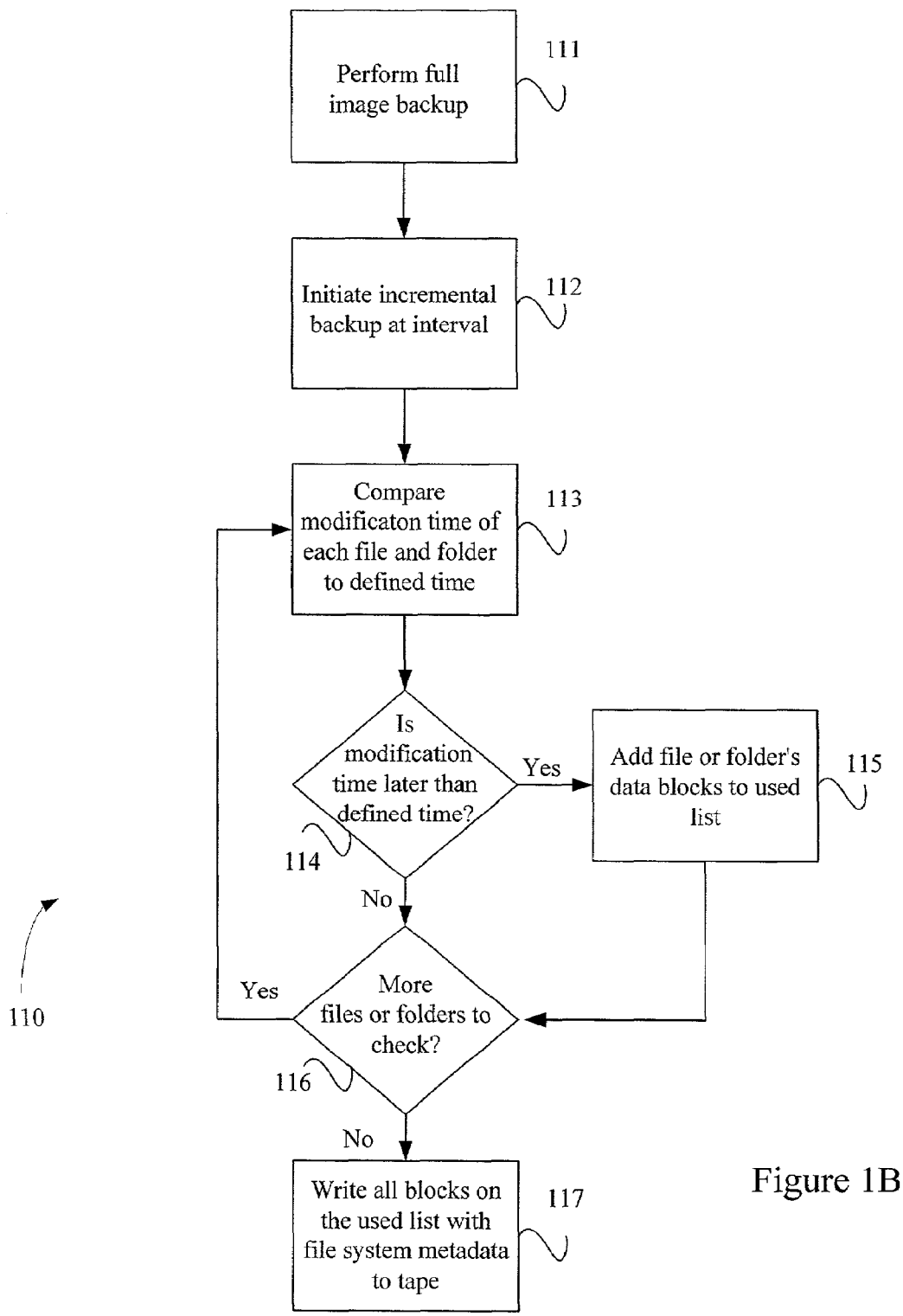
FIG. 1B illustrates one embodiment of an image backup method using the modification time of each file and folder to include only data from files and folders that have changed and the file system metadata.

FIG. 1B illustrates another method 110 for performing an image incremental backup. In method 110, a full image backup can be performed in step 111. Then, an incremental backup can be initiated at a predetermined interval in step 112. During the incremental backup, the modification time of each file and folder can be compared to a defined time in step 113. If the modification time is later than the defined time, as determined in step 114, then the data block including that file/folder can be added to the used list in step 115. This loop continues until all files and folder have been examined, as determined by step 116. In step 117, the image incremental is written to tape by writing all blocks on the used list as well as all file system metadata to tape. Thus, an image incremental backup has been accomplished that includes all the data from files and folders that have been modified as well as the file system metadata.

Advantageously, because both of these image incremental backups include the file system metadata as well as the files and folders that have changed, all file system changes can be reflected in the backup. Specifically, all files and folders that are new, changed, removed, renamed, and linked are reflected in the image incremental backup.

Therefore, of importance, including file system metadata in the backup significantly increases the accuracy of the backup compared to a standard file-by-file backup, which only identifies new/changed files. Moreover, because an image backup writes data in disk order, not file order, this backup is faster than a standard file-by-file backup. Finally, because each file's/folder's modification time is already part of the file system metadata being tracked and updated by the file system, this backup method has no associated overhead during normal operation.

Advantageously, because an image incremental backup includes all file system metadata, this image incremental backup along with the last full image backup can be used to restore a system to the point in time of the last backup in the event of a disaster. Thus, image incremental backups along with the last full image provide an effective and efficient disaster recovery mechanism.

As this method of incremental backup is dependent on modification time being accurate for correctly determining which data blocks are backed up during an incremental backup, special steps can be taken if the system clock is ever adjusted in time. For example, if the system clock is adjusted backwards, then the time comparisons would be incorrect if the system time is adjusted earlier than the last recorded backup.

Figure 2A:
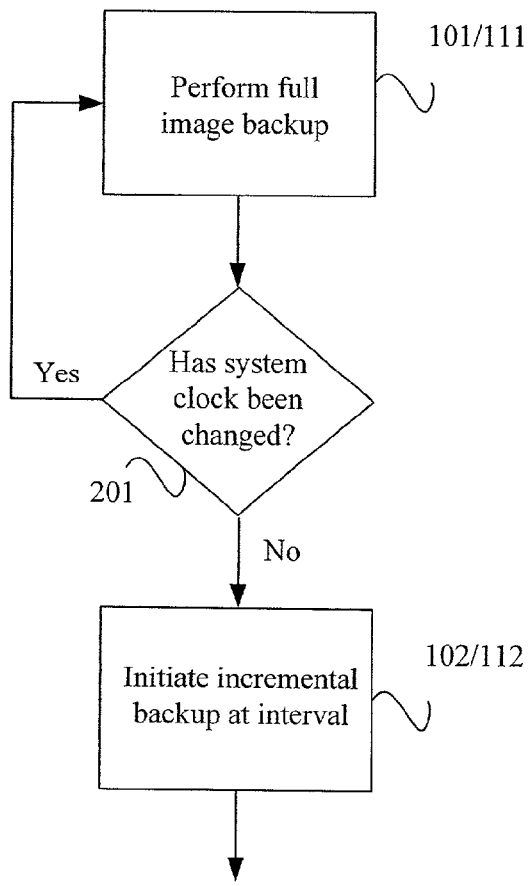
FIG. 2A illustrates another embodiment of an image backup method including metadata for providing an incremental backup, wherein a changed system clock triggers a full image backup before an incremental backup is initiated.
Figure 2B:
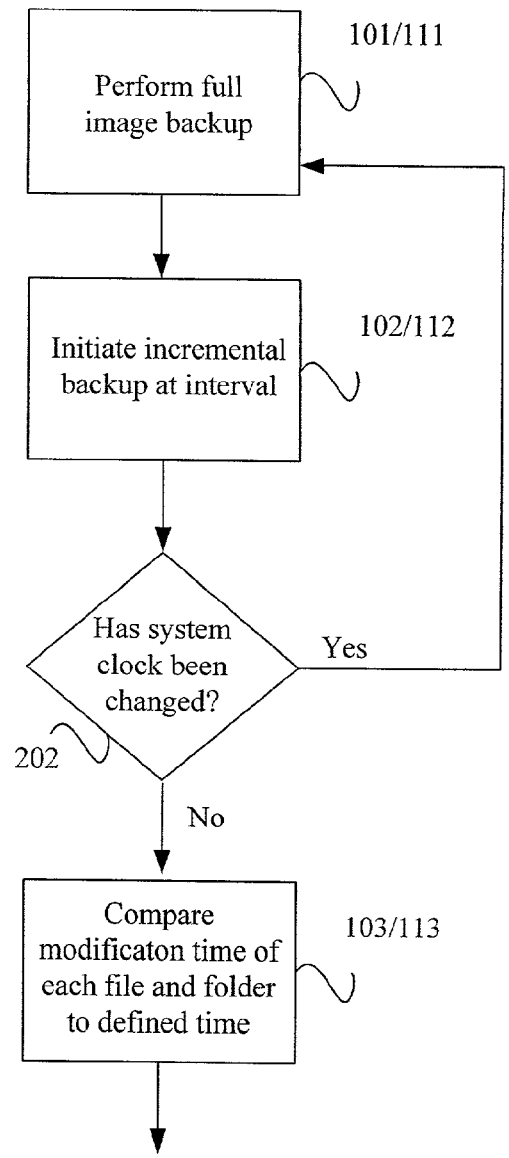
FIG. 2B illustrates another embodiment of an image backup method including metadata for providing an incremental backup, wherein a changed system clock triggers a full image backup after an incremental backup is initiated.
Figure 3:
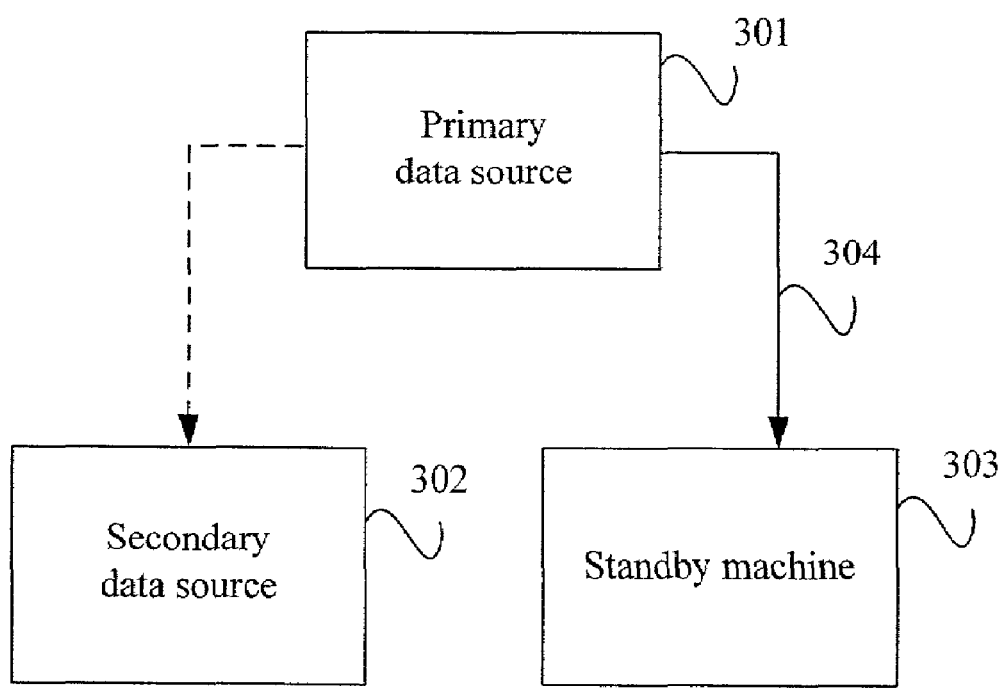
FIG. 3 illustrates a system including a primary data source coupled to a secondary data source as well as to a standby machine, thereby allowing a point-in-time disaster recovery.

Thus, in accordance with one feature of the invention, if the system time is changed, a full image backup can be triggered. FIG. 2A illustrates a case wherein the system clock can change after a full image backup, but before an incremental backup. In this case, a step 201, which follows step 101/111 of performing the full image backup, can determine whether the system clock has been changed. If it has, then the process returns to step 101/111 of performing the full image backup. Otherwise, the process continues with step 102/112 of initiating the incremental backup at a predetermined interval. FIG. 2B illustrates a case wherein the system clock can change after both the full and incremental backups. In this case, a step 202, which follows step 102/112 of initiating an incremental backup at a predetermined interval, can determine whether the system clock has been changed. If it has, then the process returns to step 101/111 of performing the full image backup. Otherwise, the process continues with step 103/113 of comparing the modification time of each file and folder with a defined time. Note that subsequent steps in FIGS. 2A and 2B are not shown, but would be the same as those shown in FIGS. 1A and 1B. Further note that steps 201 and 202 can be performed in the same or different embodiments.

In accordance with one feature of the invention, after each full image backup and subsequent image incremental backup, the data can be written to a standby machine as well as to tape. In one embodiment, each full image backup and subsequent image incremental backup can be written to and directly restored on the standby machine, thereby eliminating the need for writing the data to tape. For example, FIG.

3 illustrates a primary data source 301 coupled to a secondary data source 302 (such as a tape) for backup (both full image and incremental image, in accordance with the invention). Primary data source 301 can also be coupled to a standby machine 303 for substantially the same purpose. In one embodiment, the backup data for primary data source 301 can be written directly over a network 304 to and restored on standby machine 303. In this manner, standby machine 303 can be kept up-to-date with primary data source 301 as of the last backup, thereby providing an operational system very quickly after a disaster that renders primary data source 301 unusable. In other words, standby machine 303 can advantageously provide a point-in-time (i.e. the time of the last backup) disaster recovery for primary data source 301.

In one embodiment, the Network Data Management Protocol (NDMP) (i.e. an industry standard for backing up heterogeneous file servers) can implement the backup method of the invention. Note that the data blocks can include both used and unused bits, or only used bits. Moreover, the data blocks can include files (or portions thereof) from one or more disks. The use of metadata to provide incremental backup is equally applicable to all such embodiments.

A method for providing image incremental and disaster recovery is described in various embodiments herein. Those skilled in the art will recognize modifications to those embodiments. Therefore, the scope of the present invention should only be limited by the appended set of claims.

The invention claimed is:

1. A method for backing up data in a computer system from at least one primary data source to a secondary data source, the method comprising:
   performing a full image backup in disk order on a plurality of data blocks stored by the at least one primary data source;
   initiating an incremental backup at a predetermined interval, the incremental backup including file system metadata;
   comparing a modification time of each file/folder at the predetermined interval to a defined time, the file system metadata including each modification time, wherein if the modification time is earlier than the defined time, then excluding data blocks of that file/folder from the incremental backup; and determining whether a system clock has been changed,
   wherein if the system clock has been changed, then returning to performing the full image backup on the plurality of data blocks, and
   wherein if the system clock has not been changed, then performing one of:
   initiating the incremental backup at the predetermined interval; and
   comparing the modification time of each file/folder at the predetermined interval to the defined time.

2. The method of claim 1, wherein the defined time is a time when the full image backup was performed.

3. The method of claim 1, wherein the defined time is a time when a last incremental backup was performed.

4. The method of claim 1, wherein the defined time is one of a first time when the full image backup was performed and a second time when a last incremental backup was performed, whichever is the more recent.

5. The method of claim 1, wherein the file system metadata allows the tracking of new, changed, renamed, and linked files/folders.

6. The method of claim 1, wherein the full backup and the incremental backup are used to provide a point-in-time disaster recovery.

7. The method of claim 1, wherein the full image backup and the incremental backup are used to keep a standby machine up-to-date as of a last backup.

8. The method of claim 1, wherein the full image backup and the incremental backup are written directly over a network to a standby machine and recovered, thereby keeping the standby machine up-to-date as of a last backup.

9. A method for backing up data in a computer system from at least one primary data source to a secondary data source, the method comprising:
   performing a full image backup in disk order on a plurality of data blocks stored by the at least one primary data source;
   initiating an incremental backup at a predetermined interval, the incremental backup including file system metadata;
   comparing a modification time of each file/folder at the predetermined interval to a defined time, the file system metadata including each modification time, wherein if the modification time is later than the defined time, then including data blocks of that file/folder in the incremental backup; and determining whether a system clock has been changed,
   wherein if the system clock has been changed, then returning to performing the full image backup on the plurality of data blocks, and
   wherein if the system clock has not been changed, then performing one of:
   initiating the incremental backup at the predetermined interval; and
   comparing the modification time of each file/folder at the predetermined interval to the defined time.

10. The method of claim 9, wherein the defined time is a time when the full image backup was performed.

11. The method of claim 9, wherein the defined time is a time when a last incremental backup was performed.

12. The method of claim 9, wherein the defined time is one of a first time when the full image backup was performed and a second time when a last incremental backup was performed, whichever is the more recent.

13. The method of claim 9, wherein the file system metadata allows the tracking of new, changed, renamed, and linked files/folders.

14. The method of claim 9, wherein the full backup and the incremental backup are used to provide a point-in-time disaster recovery.

15. The method of claim 9, wherein the full image backup and the incremental backup are used to keep a standby machine up-to-date as of a last backup.

16. The method of claim 9, wherein the full image backup and the incremental backup are written directly over a network to a standby machine and recovered, thereby keeping the standby machine up-to-date as of a last backup.

* * * * *